(12) United States Patent
Sirignano

(10) Patent No.: US 7,051,983 B2
(45) Date of Patent: May 30, 2006

(54) ADJUSTABLE BAR ELECTRICAL WIRE FASTENER

(76) Inventor: Michael A. Sirignano, 48 Longstreet Rd., Manalapan, NJ (US) 07726

( * ) Notice: Subject to any disclaimer, the term of this patent is extended or adjusted under 35 U.S.C. 154(b) by 40 days.

(21) Appl. No.: 10/918,860

(22) Filed: Aug. 16, 2004

(65) Prior Publication Data

US 2006/0032655 A1    Feb. 16, 2006

(51) Int. Cl.
*F16L 3/22* (2006.01)
*F16L 3/08* (2006.01)

(52) U.S. Cl. ........................... 248/68.1; 248/74.2
(58) Field of Classification Search .......... 439/719; 248/57, 68.1, 62, 71, 73, 74.2
See application file for complete search history.

(56) References Cited

U.S. PATENT DOCUMENTS

| | | | | |
|---|---|---|---|---|
| 3,718,307 A | * | 2/1973 | Albanese | 248/57 |
| 3,807,675 A | * | 4/1974 | Seckerson et al. | 248/73 |
| 4,717,099 A | * | 1/1988 | Hubbard | 248/57 |
| 4,973,187 A | * | 11/1990 | Sauder | 403/205 |
| 5,067,677 A | * | 11/1991 | Miceli | 248/68.1 |
| 5,090,645 A | * | 2/1992 | Zuercher | 248/68.1 |
| 5,188,318 A | * | 2/1993 | Newcomer et al. | 248/68.1 |
| 5,209,441 A | * | 5/1993 | Satoh | 248/74.2 |
| 5,593,115 A | * | 1/1997 | Lewis | 248/68.1 |
| 5,743,497 A | * | 4/1998 | Michael | 248/68.1 |
| 6,543,731 B1 | * | 4/2003 | Mercier | 248/62 |
| 6,622,976 B1 | * | 9/2003 | Ianello | 248/73 |

\* cited by examiner

*Primary Examiner*—Neil Abrams
(74) *Attorney, Agent, or Firm*—Charles I. Brodsky

(57) ABSTRACT

A plurality of non-electrically conductive wire stackers are emplaced along the length of a non-electrically conductive bar installed between vertical studs, with fingers of the stackers being deflectable away from one another upon the insertion of an electrical wire therebetween, to be thereafter held in place by the fingers resiliently returning to their initial alignments.

3 Claims, 3 Drawing Sheets

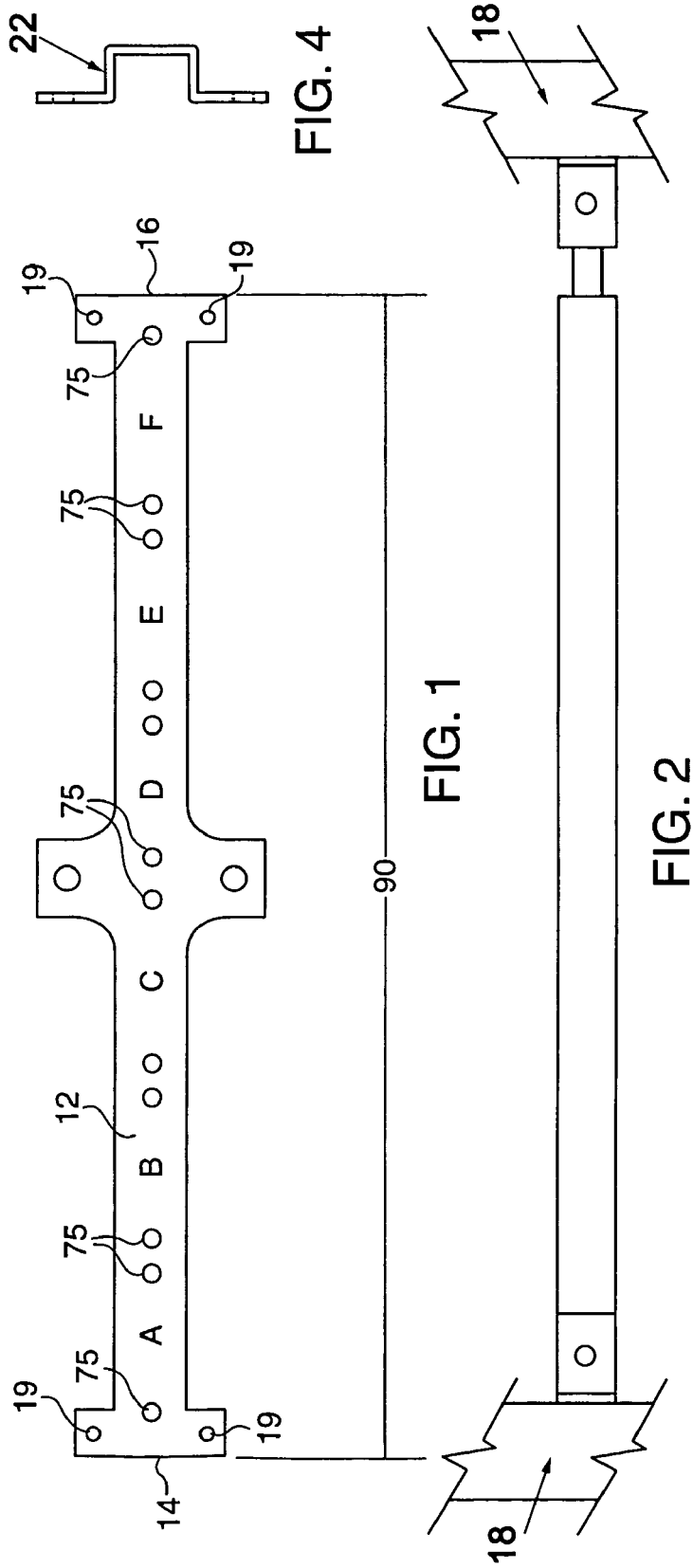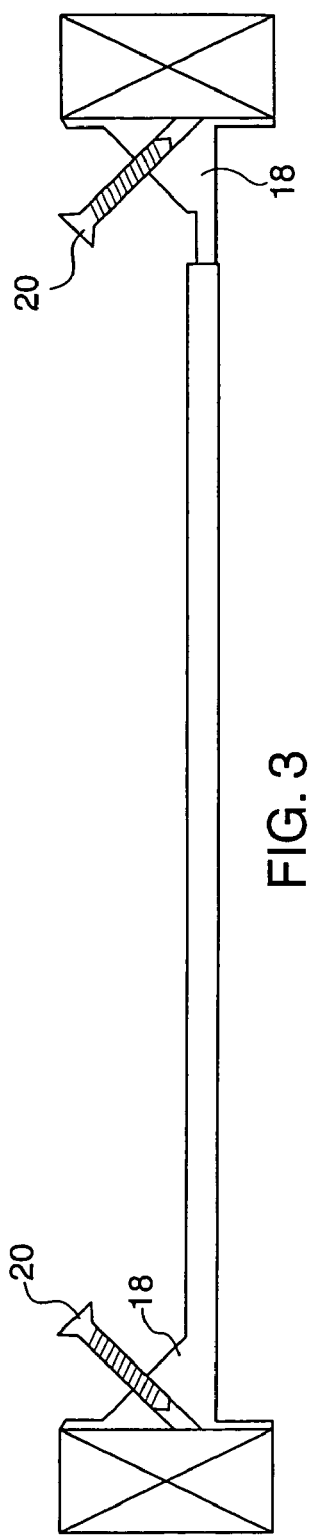

ADJUSTABLE BAR ELECTRICAL WIRE FASTENER

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the electrical wiring of a house or apartment building, in general, and to the installation of the electrical service panels used therein, in particular.

2. Description of the Related Art

As appreciated, enhanced safety codes for the installation of electrical wiring in the building industry are increasingly being proposed and adopted. One recently approved code changed the traditional way of wiring into an electrical service panel—where the wires (no matter their gauge) were allowed to hang loose in connecting to the individual circuit breakers through the knock-out holes of the panel. With the adopted code provision, the wires now have to be supported a prescribed distance from the top of the panel.

The typical approach for dealing with this change was to cut a piece of wood, nail it between adjacent studs which secured the panel in place, and staple each pair of wires to the wood as a support. This approach, however, presents the undesirable possibility that the metal staples might pierce the wires and give rise to "arcing" and fire. Even were this not the case, though, the procedure would still entail having to find a piece of wood as the support, cutting it to size, getting a hammer and nails to secure the support to the studs, getting a stapling gun, and then stapling each wire in place. Analysis has shown that this could take even an experienced electrician 45 minutes and more to secure the wiring according to code, and to take anywheres from 2-½ to 3 hours to install a single service panel. Obviously, it would be desirable if this 45 minutes of preparation time could be reduced—while, at the same instant, reducing the possibility of arcing because of pierced wiring when power is turned on.

SUMMARY OF THE INVENTION

As will become clear from the following description, the electrical wire fastener of the present invention overcomes these problems of installing the electrical wires with the service box panel. In particular, the fastener first includes a bar of non-electrically conductive material having first and second opposite ends, each of which is secured to one of the pair of vertical studs supporting the panel. A plurality of non-electrically conductive wire stackers are incorporated along the length of the bar between its ends, with each of the wire stackers being composed of a base having two or more upwardly extending fingers. Each finger will be seen to have a tail end at the base and a head end, with the distance between the tail ends of adjacent fingers being at least as great as the width of the electrical wire to be fastened. The distance between the head ends of the adjacent fingers, on the other hand, is less than the width of the wire, but with the adjacent fingers being resilient and deflectable away from one another when the electrical wire is inserted between them.

In a preferred embodiment of the invention, the bar is of adjustable length, and together with the wire stackers forms a one-piece fabrication. A pair of non-electrically conductive angled clips couple to apertures at each of the bar's opposite ends, and are securable to the studs by means of nails or screws. To facilitate installations where the stackers and bar are not of a one-piece fabrication, the bar may include a plurality of spaced apertures along its length, for plugging each stacker in place. In such an arrangement, the facing fingers of adjacent wire stackers may include a projection on one, to fit within a recess on another so as to join adjacent stackers together. This likewise makes the bar a single integrated unit.

With the bar so secured between the studs, all that is required is to insert the electrical wire to spread apart the head ends of the adjacent fingers, which then deflect back to their original alignment to hold the wire in place because of the narrower spacing.

BRIEF DESCRIPTION OF THE DRAWINGS

These and other features of the present invention will be more clearly understood from a consideration of the following description taken in connection with the accompanying Drawings, in which:

FIGS. 1–4 are pictorial views helpful in an understanding of the non-electrically conductive bar of the fastener, and its manner of securement between a pair of vertical studs;

DETAILED DESCRIPTION OF THE INVENTION

Figure 8:
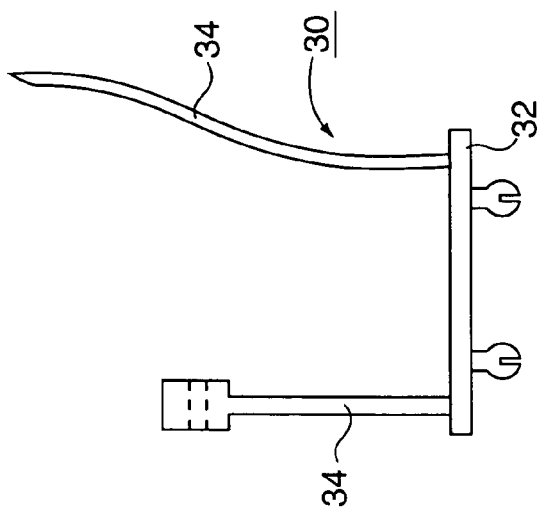
FIGS. 5–8 are front views of embodiments of the wire stackers emplaced along the length of the bar according to the invention.
Figure 10:
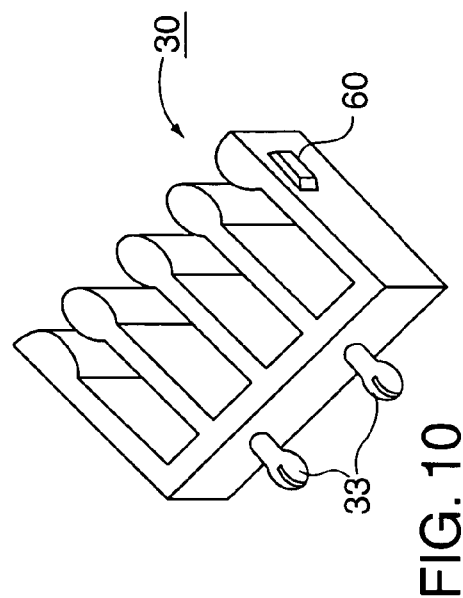
FIG. 10 is a perspective view of a further type of stacker which might be joined with the bar to retain a pipe in place, rather than an electrical wire.

Referring to FIGS. 1–4 and 11, the electrical wire fastener of the invention 10, includes a bar of non-electrically conductive material 12 having first and second opposite ends 14, 16. Intended for placement between a pair of vertical studs 101, 102 between which a surface box panel 103 is secured, the bar 12 includes a plurality of spaced apertures 75 along its length, between pairs of which a plurality of wire stackers are to be emplaced, as at A, B, C, D, E, F (top view, FIG. 1). The bar 12, in a preferred embodiment of the invention, is selected of length, so as to adjust to the spacing normally found in house and/or apartment building construction. As will be readily understood by those skilled in the art, the adjustments in length may be accomplished either by pulling the ends 14, 16 outwardly, or by pushing them together the needed amount (rear view, FIG. 2). A pair of angled clips 18 of non-electrically conductive material are coupled with one or both apertures 19 at the ends of the bar to secure with the studs 101, 102 by a screw or nail 20 (FIG. 3). A clamp 22 can be fitted with the bar 12 to tighten the bar in place (FIG. 4). With the clips 18 in place, the bar 12 can be adjusted to provide an overall length of 14-3/4 inch to 23 inch.

The spacing of the apertures 75 in FIG. 1 are selected so as to accept the prongs 33 of a plurality of wire stackers 30 of the configuration shown in FIGS. 5–8 and 10. Each stacker includes a base 32 and two or more upwardly extending fingers 34. Each finger 34 includes a tail end 36 and a head end 38, with adjacent ones of the fingers being resiliently deflectable away from one another upon the insertion of an electrical wire therebetween (such as "X", in FIG. 11). To hold the wire in position after insertion, the distance between the tail ends 36 of adjacent fingers are selected at least as great as the width of the electrical wire, while the distance between the head ends are selected less than that width. Insertion of an electrical wire between the head ends of adjacent fingers then spreads the head ends outwardly apart, such that after the wire is emplaced between the tail ends of those fingers, the head ends spring back to their initial alignments to hold the wire fast. As will be appreciated, the prongs 33 are selected of a dimension to squeeze into the apertures 75 of the bar 12.

Figure 5:
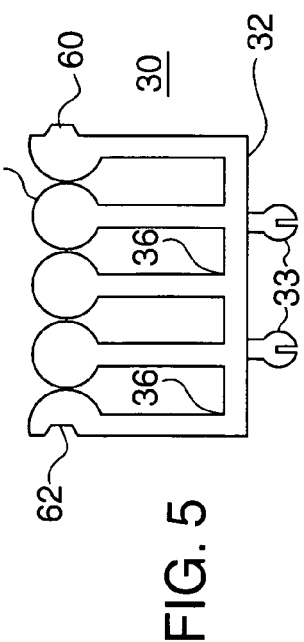
Figure 6:
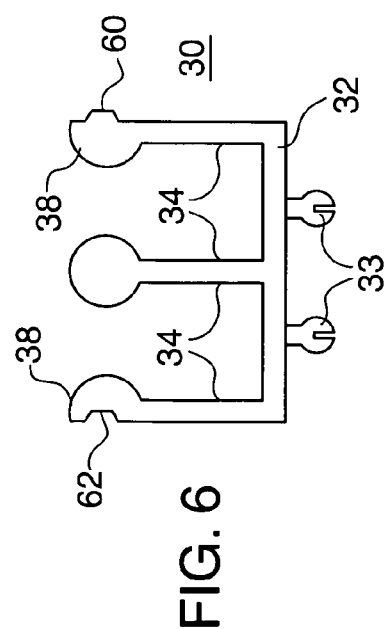
Figure 7:
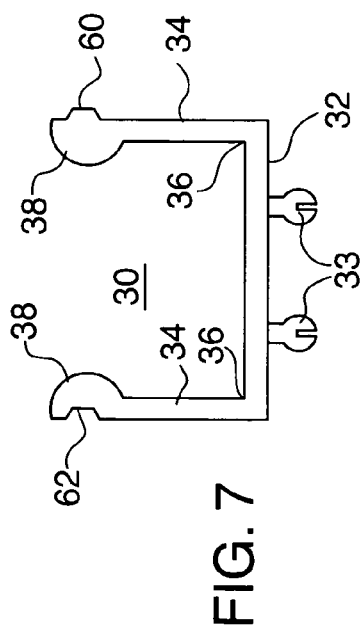

FIG. 5 illustrates a stacker as might be used with thin gauge electrical wires, while FIGS. 6 and 7 illustrate stackers that might be employed with intermediate and thick gauge electrical wires, respectively. FIG. 8, on the other hand, illustrates a stacker of the type that might be employed with several differing electrical wire gauges, as the curvature allows differing amounts of deflection depending upon the needs of the situation. Where it is desired to secure the individual wire stackers together, various types of coupling arrangements could be employed on their adjacent facing fingers. In FIGS. 5–7 and 10, for example, a projection 60 is included on one such finger to fit within a recess 62 on the facing finger of an adjacent stacker.

Figure 9:
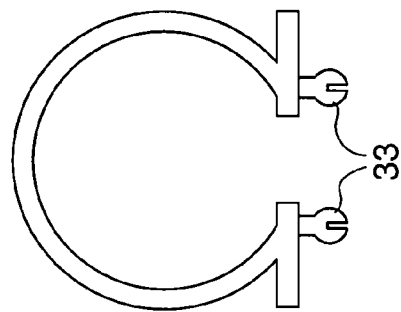
FIG. 9 is a front view of the wire stacker of FIG. 5.

(As will be readily appreciated by those skilled in the art, the foregoing description is applicable to an electrical wire fastener construction in which the individual wire stackers are fitted within spaced apertures on a non-electrically conductive bar. The teachings of the invention, however, will be seen to apply equally as well where the wire stackers and the bar are part of a single integrated one-piece fabrication formed at the time of manufacture.) As in some instances various pipes may be brought down in the area of the service box panel 103 in a house or apartment building construction, yet a further type of stacker might be fitted within the apertures 75 of the bar 12—such as that of FIG. 8 or 9 for securing a metal or plastic pipe in position.

Figure 11:
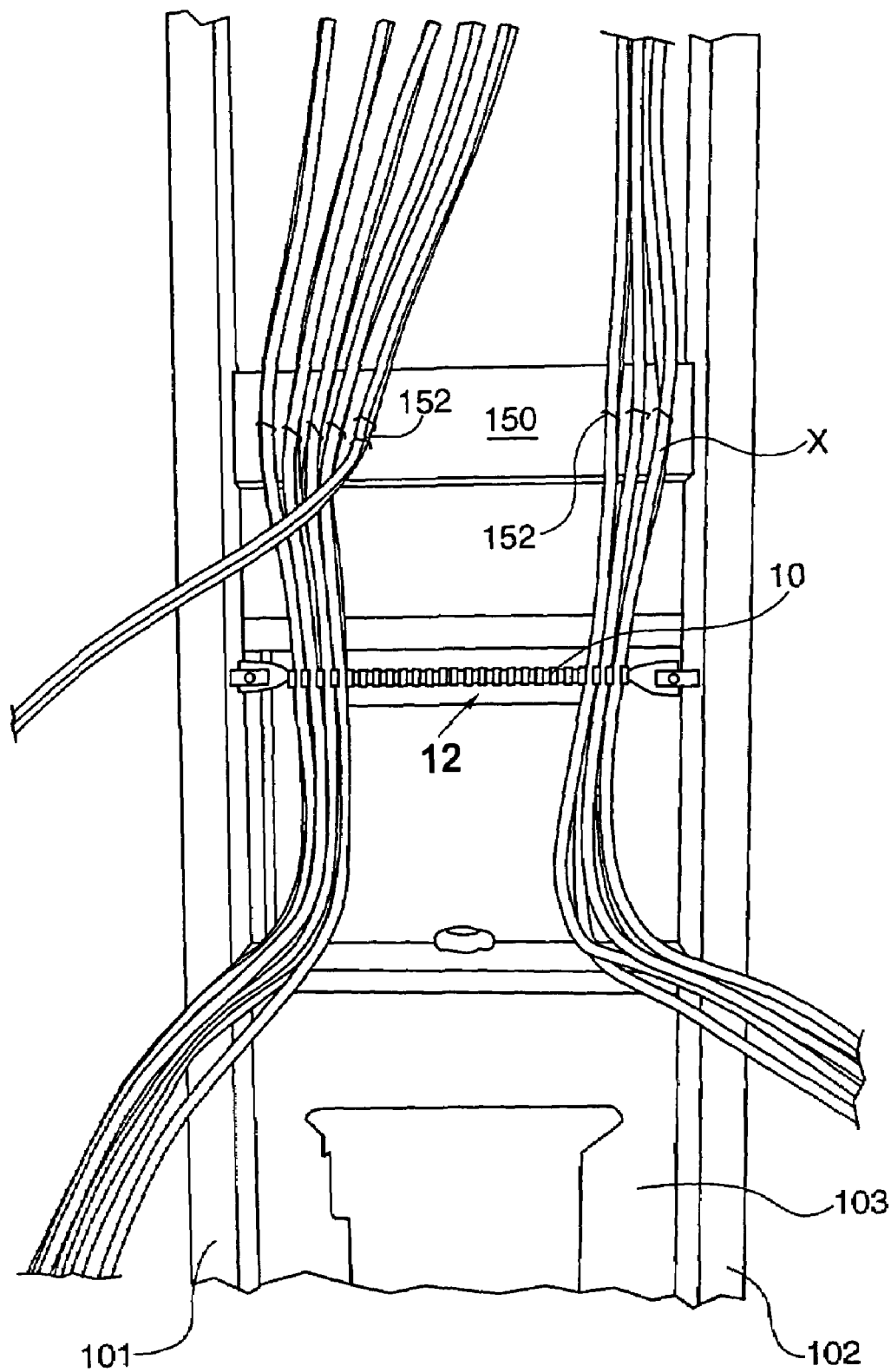
FIG. 11 is an illustrative view of the lead-in to a service box panel helpful in an understanding of the advantages of the invention.

FIG. 11 shows a prior art construction used to bring electrical wiring towards the service box panel 103. A piece of wood 150 is cut to size and nailed between the studs 101, 102—and the electrical wires "X" are then stapled to the wood 150, as at 152. With the present invention, —as also shown in FIG. 11—the board 150 is eliminated, and the bar 12 with the stackers 30 in position is simply screwed or nailed to the studs by means of the clips 18. The electrical wiring "X" is simply pulled down and fitted between the head ends 38 of the fingers 34, where they are held fast in place by the distance between the tail ends 36 and the head ends. The result will be seen to be a compliance with the now required Electrical Codes, a measurably safer installation, and an installation which can be accomplished far quicker, easier and less expensive.

While there have been described what are considered to be preferred embodiments of the present invention, it will be readily understood by those skilled in the art that modifications can be made without departing from the scope of the teachings herein. For at least such reason, therefore, resort should be had to the claims appended hereto for a true understanding of the scope of the invention.

I claim:

1. An electrical wire fastener for a service box panel supported by a pair of vertical studs, comprising:
   a bar of non-electrically conductive material having first and second opposite ends;
   means for securing each end of said bar to one of said pair of vertical studs; and
   a plurality of non-electrically conductive wire stackers along the length of said bar between said opposite ends;
   with each of said wire stackers being composed of a base with two or more fingers upwardly extending from said base, with said fingers having a tail end at said base and a head end remote therefrom, with a distance between the tail ends of adjacent fingers being at least as great as the width of an electrical wire to be fastened, with a distance between the head ends of adjacent fingers being less than said width, and with adjacent ones of said fingers being resiliently deflectable away from one another upon insertion of the width of an electrical wire therebetween:
   wherein said means includes a pair of angled clips of non-electrically conductive material coupled to an aperture at each of said opposite ends of said bar, and one of a nail and screw for securement of each of said clips to one of said studs; and
   wherein said bar includes a plurality of spaced apertures along its length, and wherein the base of each wire stacker includes one or more prongs to plug into said spaced apertures; and
   also including means on facing fingers of adjacent wire stackers for arranging said adjacent wire stackers with said bar as a single integrated unit.

2. The electrical wire fastener of claim 1 wherein said last-mentioned means includes a projection on one finger of one wire stacker to fit within a recess on a facing finger of an adjacent wire stacker.

3. The electrical wire fastener of claim 2 wherein said bar is of adjustable length.

* * * * *